Dec. 8, 1936.　　　H. F. HANSEN ET AL　　　2,063,374
INTERNAL COMBUSTION ENGINE
Filed Sept. 25, 1934
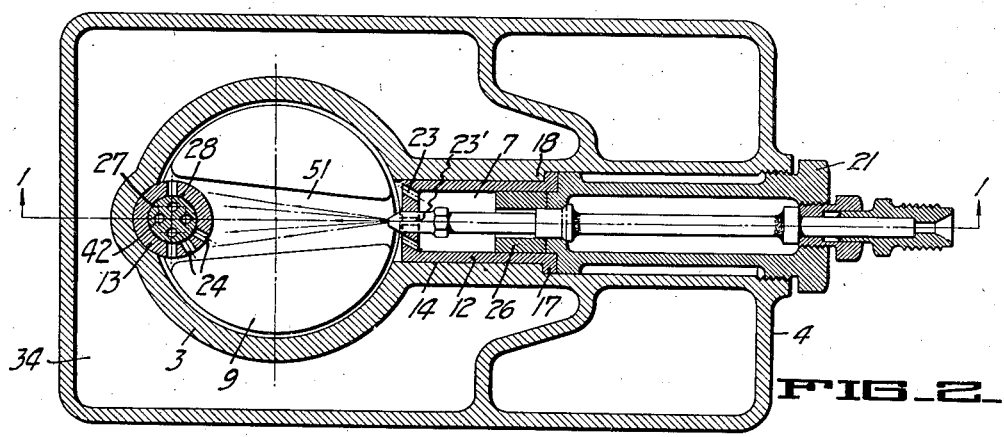
FIG_2_
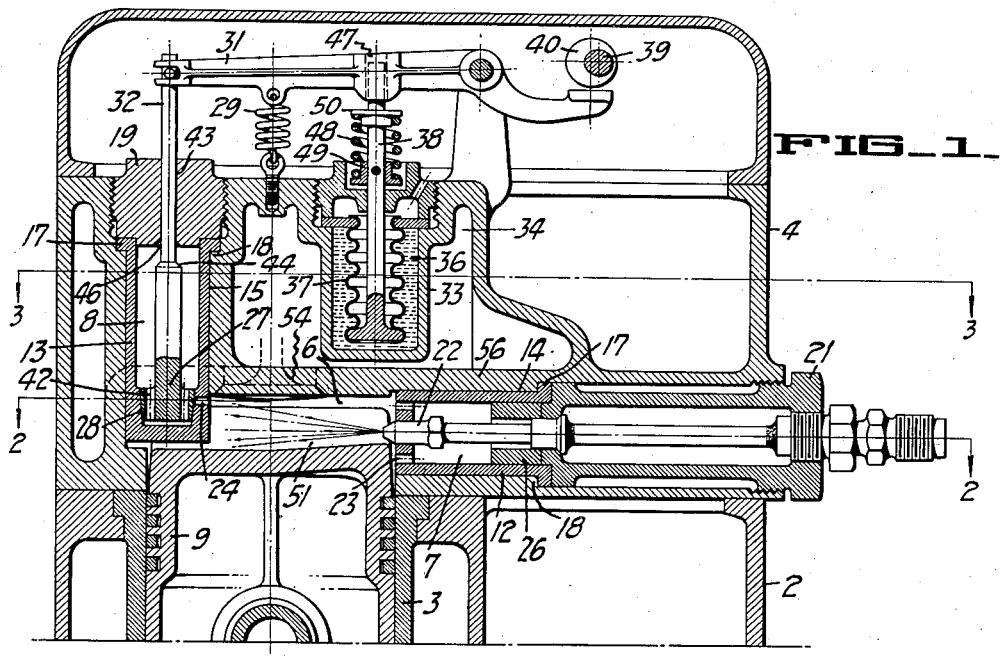
FIG_1_
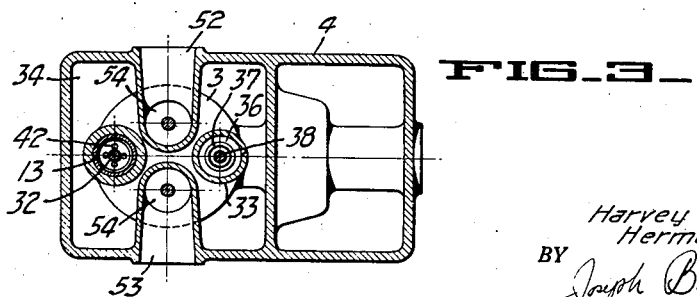
FIG_3_
INVENTORS
Harvey F. Hansen
Herman J. Scholtze
BY Joseph B. Gardner
ATTORNEY Patented Dec. 8, 1936

2,063,374

UNITED STATES PATENT OFFICE 2,063,374

INTERNAL COMBUSTION ENGINE

Harvey F. Hansen, Alameda, and Herman J. Scholtze, Berkeley, Calif.

Application September 25, 1934, Serial No. 745,406

4 Claims. (Cl. 123—32)

The invention relates in general to internal combustion engines, particularly of the Diesel and like type, and relates more specifically to the combustion chamber design for such engines.

As is more or less known, one of the several classes of combustion chamber designs now employed for Diesel engines, is known as the air-cell type. In such, there is provided in communication with the portion of the combustion chamber in which the injection nozzle is located, a small chamber or cell into which a quantity of air is forced during the compression stroke. Communication between the cell and main chamber is afforded through only a relatively restricted passage, and since the fuel nozzle has its discharge in the main chamber the burning is confined exclusively to such chamber. On the power stroke the air entrapped in the cell is released as the piston descends so as to thereby supply more air to the fuel.

We have discovered that in the engines heretofore constructed embodying the combustion chamber design aforesaid, considerable loss in efficiency in operation is caused by the fact that the air released from the cell is at a reduced temperature by the time it commingles with the mixture in the main chamber. The low temperature is caused by the heavy heat losses in the walls defining the cell chamber. Hitherto these walls have generally been formed of cast iron and the positioning of the cell in the cylinder head has not been effected with a view to increasing or conserving the heat in the cell air or walls. The period of entry of the cell air into the main chamber is dependent of course on the relative pressures in the chambers, and since the lowering of the temperature of the cell air will delay the discharge of said air to the chamber, not only will the burning mixture be deprived during the early portion of the power stroke of the benefit of the cell air itself, but of whatever turbulence impressed on the mixture by the cell air on its discharge into the combustion chamber. It will thus be clear that the matter of maintaining the temperature of cell air is highly important.

In view of the foregoing, it is one of the objects of our invention to provide an engine with a combustion chamber of the type described in which the portion of the engine defining the air cell is so formed and positioned as to cause a preheating of the air in the cell and thus insure not only the entry of the air into the combustion chamber at a high temperature but early during the power stroke.

Another object of the invention is to arrange for the control of the air from the cell as a means of varying the compression ratio.

A further object of the invention is to arrange for the introduction of the cell air to the combustion chamber in such manner as to provide a thorough air swirl in the latter across the path of the fuel discharge.

A further object of the invention is to provide for the automatic variation in the compression ratio of the engine in accordance with the thermostatic conditions in the cylinder head, the mode of operation being such that when the resident heat in the head is sufficient for effecting ignition of the fuel with a lower pressure than what is being supplied by the displacement of the piston, the engine will be caused to operate with a lower compression ratio, whereas when operating at such low ratio and the load decreases, or for some reason the resident heat becomes too low for operation of the engine, the engine will be caused to thereupon operate on a greater compression ratio.

An additional object of the invention is to insure in an engine affording operation at a low compression ratio, a relatively high compression ratio for starting purposes.

A still further object of the invention is to provide in combination with an air cell to the combustion chamber, an arrangement for fuel introduction which will serve to effectively provide for thorough preheating of the fuel.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a longitudinal sectional view of the head end of the engine.

Figure 2 is a transverse sectional view of the engine taken through the combustion chamber, the plane of the section being indicated by the line 2—2 of Figure 1.

Figure 3 is a transverse sectional view taken on the line 3—3 of Figure 1.

As illustrated in the drawing, the parts of our invention are incorporated in an engine 2 of the Diesel type arranged for so-called solid injection of fuel and provided with a cylinder 3 and a head 4 in which is formed a combustion chamber 6. Also provided in the head 4 are a set of air cells 7 and 8 which extend preferably generally outward from the combustion chamber but have their inner end communicating therewith. The cells in accordance with the usual practice are connected with the chamber by relatively restricted passages so that while air may be readily forced into the cells on the compression stroke of the piston 9, the air when once in the cells will be temporarily entrapped and substantially out of range of the products in the combustion chamber.

As will be clear from Figure 1, the cells 7 and 8 are defined by tubular casings 12 and 13 respectively which are fitted in bores 14 and 15 in the cylinder head 4. The casings 12 and 13 are preferably removably disposed in the bores and each is provided as here shown with a flange 17 which seats against a shoulder 18 in the bore so as to limit the inward positioning of the casing. To retain the casings in position, a nut 19 is threadedly engaged in the head and held against the outer end of casing 13, while in the instance of casing 12 an elongated special nut 21 is likewise threadedly engaged in the head and is arranged to bear against the casing 12. Removal of the casings may of course be accomplished by removal of the nuts.

Instead of the casings 12 and 13 being of a material such as the usual cast-iron of which the cylinder and head is generally formed, such casings are desirably made of a material of relatively high conductivity and one which will be able to withstand high temperatures without much expansion. A satisfactory material for the purpose is nickel cast-iron, since its expansion at high temperatures is about equal to that of the water-jacketed bore walls under normal operating conditions. It will be clear that due to the high conductivity of the casing walls, the heat transferred to the latter by thermal contact with the burning products in the combustion chamber will be quickly impressed on and caused to preheat the air confined within the cells. In this manner, as will also be clear, not only will the air be heated to a higher degree than otherwise and thus caused to mix more effectively with the air and fuel in the combustion chamber, but by reason of its reaching a maximum temperature—and likewise a maximum pressure—so much sooner, the air will be forced back into the combustion chamber proportionately earlier in the power stroke and with the resultant greater effectiveness as before said. As a means of insuring the effective heating of the cells, each of them or as here shown the cell 13 is designed with the exterior thereof extending for an appreciable length directly into the combustion chamber. As will be clear from Figures 1 and 2, practically the entire inner end portion of casing 13 lies exposed in the chamber, and what is of extreme importance, the portion of the cell thus exposed in the chamber lies directly in the course of the fuel emitted from the nozzle 22 which discharges into the chamber. It will thus be evident that with the casing formed and positioned in accordance with our invention, the effective heating of the cell air will be, particularly in the casing 13, amply assured.

In connection with the casing 12, novel means are provided for preheating with the highly heated air therein, the fuel arranged for discharge into the combustion chamber. As will be clear from the drawing, the fuel nozzle 22 enters the combustion chamber by way of the casing 12, and such nozzle extends through said casing as well as the nut 21. Preferably the nozzle extends centrally of the casing with its sides spaced from the interior of the casing sides whereby a large portion of the length of the nozzle will be directly exposed to the air in the cell. It will be seen that such an arrangement not only serves to pre-heat the fuel passing through the nozzle but protects the nozzle structure as well. It will also be noted that the air passages or openings 23 between the chamber and cell, surround the nozzle and are inclined so as to direct the air released from the cell tangentially of the chamber. Preferably, however, at least one opening 23' has its axis more or less parallel to that of the flow of the fuel spray so that the air will follow the course of the spray as well as swirl around the chamber to increase the turbulence of the mixture therein. Additional turbulence of the mixture in the chamber is provided by arranging the passages or openings 24 of the other casing 13 in such manner as to direct the released air tangentially of the chamber, the openings 24 for the most part cooperating with the openings 23 in effecting a swirl in the same rotative direction.

If desired a bushing 26 may be positioned within the casing 12 so as to provide a means of varying the volumetric capacity of the chamber and cells. The bushing may be removed or replaced by a larger or smaller one by removing the nut 21 thus making it a very simple matter to vary the volume as aforesaid to suit the conditions under which the engine may be operated.

Means are provided for automatically varying the compression ratio of the engine so that when the condition of the engine and the nature of the load permits the engine will be permitted to operate on a relatively low compression ratio, whereby, as much as possible, a minimum strain will be placed on the engine and its life over a longer period thus insured. By condition of the engine is meant the thermal state of the engine head, and the functioning of the means is such that when the resident heat in the combustion chamber will with a relatively low pressure created by the piston bring about ignition of the fuel, the compression ratio will be correspondingly reduced, and conversely, when the engine is operating on the low compression ratio and due to conditions such as a low resident heat in the chamber or to the fact that the load is low for a relatively long period, the means will automatically operate to raise the compression ratio. In the present embodiment of the invention, the change in the compression ratio is effected in connection with use of one or more of the air cells, that is, under normal or heavy duty operating conditions one of the air cells will be open to the combustion chamber so as to cause a low compression ratio, while under very light running conditions and when the engine is cold such cell will be closed to the chamber so that by the same displacement created by the piston the compression ratio will be higher. As here shown, the variation in the compression ratio is effected by opening and closing the passages 24 which connect the combustion chamber with the cell or casing 13, and such opening and closing is effected by means of a valve 27 positioned within the casing and arranged to removably fit against a seat 28 therein. The passages 24 communicate with the interior of the casing at the seat so that when the valve is engaged in the seat the cell will be blocked off from the combustion chamber and a higher compression ratio will obtain in the latter on the compression stroke of the piston. Retention of the valve on the seat is urged by means of a spring 29 connected to the engine head and an arm 31 which is pivoted to such head and to the stem 32 of the valve. For causing the unseating of the valve against the resistance of spring 29, in accordance with the heat conditions in the head, there is provided in the head a tubular portion 33 which extends well into the engine cooling water space 34. Within the portion 33 is defined a chamber 36 which is sealed from said space and from the atmosphere and is arranged to contain a suitable liquid for actuating a sylphon bellows 37 located within the chamber. Utilization of the bellows to effect displacement of the valve is provided for by means of a rod 38 connected to the movable end of the bellows and arranged for contact with the arm 31. As will be readily clear, on contraction of the bellows, such as when the residual heat in the head has become relatively high, the rod will be extended and thus caused to elevate the arm whereby the valve will be unseated and the cell placed in communication with the combustion chamber. Correspondingly when such heat is low, the bellows will be allowed to expand and the rod under the influence of the spring caused to close the valve.

It will be evident that since the valve 27 will normally be closed when the engine is not running, a high compression ratio will obtain for starting purposes. This, as will be recognized by those skilled in the art is highly important since with high compression starting of the engine is relatively easy. Thus while the engine affords operation at a low compression ratio it automatically affords high compression for starting. Where the automatically operating means for effecting variation of the compression ratio is not being used or is omitted a suitable means for making the change by hand operation is preferably provided. A simple arrangement therefor is shown in Figure 1, where a manually operable shaft 39 is provided with a cam 40 which will depress or release the arm 31 in accordance with the position of the shaft.

For the purpose of balancing the valve 27 when it is in closed position, there is provided therein a plurality of longitudinally extending holes 42. These holes not only serve the purpose aforesaid, but provide an additional passage area for the flow of air when the valve is in open position.

As a means of preventing leakage from the casing 13 by way of the bore 43 through which the valve stem 32 extends, when the valve is in open position, a secondary valve 44 is provided on the stem and so positioned that when the main valve 27 is moved fully to open position, the valve 44 will move into engagement with a seat 46 surrounding the bore opening and thereby seal the latter. In order, however, to avoid possible damage to the bellows in event the engagement of valve 44 with seat 46 takes place while further effort is being exerted by the bellows to become further contracted, the contact between the rod 38 and the arm is designed to be of a yielding nature. By reference to Figure 1, it will be seen that the rod is slidably engaged in an opening 47 in the arm and that there is coiled about the rod a spring 48 which rests upon a thrust collar 49 fixed to the rod. Mounted on the rod and in turn resting upon the spring is a slidable member 50 which on elevation of the rod will resiliently engage the arm. With this arrangement, on excessive elevation of the rod when the valve 44 is seated, the member 50 will merely be forced to a more inward position in the rod against the resistance of spring 48.

It may be mentioned that while the features of our invention are applicable to engines of many different designs, particularly with respect to the head, combustion chamber, and piston an arrangement especially efficacious for use with our invention is here illustrated. In this arrangement the piston head is formed on the top with a channel 51 extending diametrically thereacross in such manner that when the piston is at the top of the stroke a guideway will be provided from the discharge orifice of the nozzle to and around the base portion of the casing 13. Such a design among other things insures a most effective heating of the air in the casing. One other factor warranting reference is the positioning of the intake and exhaust passages 52 and 53, particularly the openings 54 thereof to the combustion chamber. Both openings are located in the wall 56 of the head, which defines the top of the combustion chamber, and are positioned to lie over the top of the piston each to one side of the channel 51. In this way, not only is the air introduced in the chamber for ready distribution therethrough, but smooth and rapid exhaust of the gases from the chamber will be assured.

We claim:

1. In an internal combustion engine, the combination with a combustion chamber, and water cooling space thereabout, an air cell arranged for communication with said chamber, of means automatically operated in accordance with the thermal condition of said head for closing or opening communication between the cell and chamber and comprising a valve positionable to open or close said communication, a spring operating to move said valve to closed position, and a thermostatically operating unit extending into the water cooling space and operative to move said valve to open position incident to a predetermined heating of the engine.

2. In an internal combustion engine, the combination with a combustion chamber of an air cell having a communicating passage therebetween, a valve for closing said passage and having a stem extending exteriorly from the cell through an opening in a wall of said cell, means associated with the valve operating to close said opening when the valve is in open position, and means operative by the thermal condition in the engine head for moving said valve to open position incident to a predetermined heating of said head and arranged to yield in the valve opening movement when said first means is in closed position.

3. In an internal combustion engine, the combination with a combustion chamber communicating with an engine cylinder, of a cylindrical air cell mounted with the axis thereof generally parallel to said cylinder and having an end thereof extending into said chamber, said cell being provided with a plurality of radially extending openings in the longitudinal wall thereof adjacent said end communicating said cell and chamber, a cylindrical member reciprocally mounted in said cell and movable to and from a position covering said openings and having a passage axially therethrough communicating said cell with said openings when said member is withdrawn therefrom, a stem connected to said member and extending through the opposite end of said cell, cooperating valve and seat portions provided by said stem and last named end engageable upon movement of said member to a position uncovering said openings, and means thermostatically operated by the heat of said engine engageable with said stem for moving said member to last named position incident to a predetermined heating of the engine.

4. In an internal combustion engine, the combination with a combustion chamber of a cylindrical air cell having an end thereof disposed in said chamber and provided with a plurality of radially extending openings in a side thereof adjacent said end for communicating said cell and chamber, a valve movable to and from a position covering said openings, and thermally operated means connecting said valve for moving same to a position uncovering said opening incident to a predetermined heating of the engine.

HARVEY F. HANSEN.
HERMAN J. SCHOLTZE.